United States Patent [19]
Pallos

[11] 3,917,844
[45] Nov. 4, 1975

[54] CERTAIN NON-TERPENOID JUVENILE HORMONE MIMICKING COMPOUNDS AND THEIR USE IN CONTROLLING INSECTS

[75] Inventor: Ferenc Marcus Pallos, Walnut Creek, Calif.

[73] Assignee: Stauffer Chemical Company, Westport, Conn.

[22] Filed: July 25, 1974

[21] Appl. No.: 491,919

Related U.S. Application Data

[62] Division of Ser. No. 257,092, May 26, 1972, Pat. No. 3,846,466.

[52] U.S. Cl. ............................ 424/300; 424/DIG. 12
[51] Int. Cl.² ...................... A01N 9/12; A01N 9/20
[58] Field of Search .................... 424/300, DIG. 12; 260/455 A

[56] References Cited
UNITED STATES PATENTS
3,056,822   10/1962   D'Amico .......................... 260/455 A

FOREIGN PATENTS OR APPLICATIONS
917,869   2/1963   United Kingdom ............. 260/455 A
599,179   3/1948   United Kingdom ............. 260/455 A
1,161,255   11/1964   Germany ......................... 260/455 A

OTHER PUBLICATIONS

Borkovec, A., "Insect Chemosterilants," Vol. VII (1966) pp. 61–63.

*Primary Examiner*—V. D. Turner
*Attorney, Agent, or Firm*—Edwin H. Baker

[57] ABSTRACT

Compounds having the formula

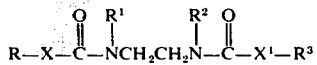

in which R is alkyl having 1 to 8 carbon atoms, $R^1$ is hydrogen or alkyl having 1 to 4 carbon atoms, $R^2$ is hydrogen or alkyl having 1 to 4 carbon atoms, $R^3$ is alkyl having 1 to 8 carbon atoms, X is oxygen or sulfur and $X^1$ is oxygen or sulfur are useful to control insects.

9 Claims, No Drawings

CERTAIN NON-TERPENOID JUVENILE HORMONE MIMICKING COMPOUNDS AND THEIR USE IN CONTROLLING INSECTS

This is a division of application Ser. No. 257,092, filed May 26, 1972, now U.S. Pat. No. 3,846,466.

This invention relates to the use of certain novel chemical compounds effective in combatting noxious insects, more particularly, the chemical compounds are certain 1,2 bis [alkyl (thio) carbamoyl] ethanes.

A new class of selective compounds has been found which exerts a disrupting influence upon the normal development of insects. Such compounds impede the metamorphosis of larvae to pupae and pupae to adults resulting in the formation of abnormal members of the treated species which may also be non-viable or sterile. This ultimately leads, indirectly at least, to the destruction of a pest population.

The compounds of the present invention are believed to have the further advantages that they are non-toxic to warm blooded animals and are highly effective in controlling insects at low dosages.

One embodiment of the present invention is concerned with novel pesticidal compositions.

In another embodiment, the invention is concerned with the active pesticidal component of such compositions.

In still another embodiment, the invention is concerned with a process for controlling insects by hindering or impeding the metamorphosis and reproduction of the insects.

The compounds of the present invention that are useful in controlling insects are those having the formula

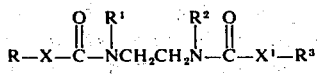

in which R is alkyl having 1 and 8 carbon atoms, preferably 2 to 6 carbon atoms; $R^1$ is hydrogen or alkyl having 1 to 4 carbon atoms, preferably hydrogen; $R^2$ is hydrogen or, preferably, alkyl having 1 to 4 carbon atoms, preferably 1 to 3 carbon atoms; $R^3$ is alkyl having 1 to 8 carbon atoms, preferably 2 to 6 carbon atoms; X is oxygen or sulfur and $X^2$ is oxygen or sulfur.

As indicated heretofore, the above compounds are useful in impeding the metamorphosis and/or the reproduction of insects. The activity of the compounds is such that insects at any stage of their development can be effectively treated therewith.

The compounds of this invention can be prepared by the following reaction:

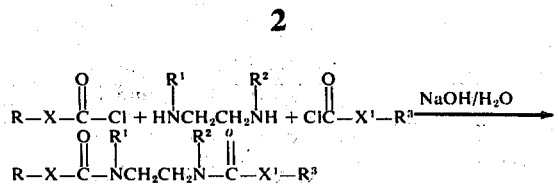

preferably the reaction is carried out in a solvent such as water, with stirring by slowly adding the alkyl chloro(thio)formate or mixture of alkyl chloro(thio)-formates to the diamine in the presence of an acid acceptor, such as a solution of NaOH, at a temperature around 0°C. followed by stirring at room temperature to complete the exothermic reaction. The reaction product is recovered by conventional techniques such as extracting with methylene chloride, washing the solvent phase with water, followed by drying with anhydrous $MgSO_4$. Finally, the solvent is filtered and removed by vacuum stripping.

Preferably, the reaction is carried out using equal mole amounts of the reactants, although a slight excess of a reactant can be used.

In compounds where R and $R^3$ are different and/or X and $X^1$ are different then a mixture of desired compounds result which can be separated by conventional techniques.

Preparation of the compounds of this invention is illustrated by the following specific examples.

EXAMPLE I

N,N'-diethyl-1,2-bis(n-propylthiocarbamoyl) ethane

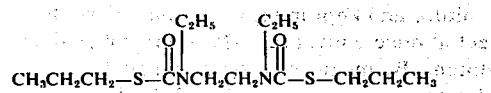

2.9 grams (0.025 mole) N,N'-diethyl ethylene diamine, 25 milliliters water, 4.0 grams (50 percent) NaOH solution (0.05 mole) are mixed in a 3-neck flask equipped with a dropping funnel and a mechanical stirrer and stirring in an ice bath. 6.9 grams (0.05 mole) n-propylchlorothiolformate are slowly dropped into the mixture causing a exothermic reaction. The ice bath is removed and the reaction mixture is stirred at room temperature for ¼ hour. The reaction product is recovered by extracting with 100 milliliters $CH_2Cl_2$ and then washing it with 75 milliliters water, followed by drying with $MgSO_4$. The organic phase is filtered and stripped to yield 6.9 grams of the desired product. $N_D^{30}$-1.5022. I.R. and n.m.r. analysis confirm the structure.

The following is a table of certain selected compounds that are preparable according to the procedures described hereto. Compound numbers are assigned to each compound and are used throughout the remainder of the specification.

TABLE I $$R-X-\overset{O}{\underset{\|}{C}}-\overset{R^1}{\underset{|}{N}}CH_2CH_2\overset{R^2}{\underset{|}{N}}-\overset{O}{\underset{\|}{C}}-X-R^3$$

| Compound Number | R | X | $R^1$ | $R^2$ | X | $R^3$ | $N_D^{30}$ |
|---|---|---|---|---|---|---|---|
| 1a | n—$C_3H_7$ | S | $C_2H_5$ | $C_2H_5$ | S | n—$C_3H_7$ | 1.4361 |
| 2 | n—$C_3H_7$ | S | n—$C_3H_7$ | n—$C_3H_7$ | S | n—$C_3H_7$ | 1.5000 |
| 3 | $C_2H_5$ | S | $C_2H_5$ | H | S | $C_2H_5$ | 1.5235 |
| 4 | n—$C_3H_7$ | S | H | $C_2H_5$ | S | n—$C_3H_7$ | 1.5110 |
| 5 | i—$C_3H_7$ | S | $C_2H_5$ | $C_2H_5$ | S | i—$C_3H_7$ | — |
| 6 | $CH_3$ | S | $C_2H_5$ | $C_2H_5$ | S | $CH_3$ | — |
| 7 | n—$C_4H_9$ | S | $C_2H_5$ | $C_2H_5$ | S | n—$C_4H_9$ | 1.4980 |
| 8 | i—$C_4H_9$ | S | $C_2H_5$ | $C_2H_5$ | S | i—$C_4H_9$ | 1.5964 |

TABLE I-continued $$R-X-C(=O)-N(R^1)CH_2CH_2N(R^2)-C(=O)-X-R^3$$

| Compound Number | R | X | R$^1$ | R$^2$ | X | R$^3$ | $N_D^{30}$ |
|---|---|---|---|---|---|---|---|
| 9 | sec—C$_4$H$_9$ | S | C$_2$H$_5$ | C$_2$H$_5$ | S | sec—C$_4$H$_9$ | 1.4959 |
| 10 | t—C$_4$H$_9$ | S | C$_2$H$_5$ | C$_2$H$_5$ | S | t—C$_4$H$_9$ | 71–75°C. |
| 11 | i—C$_3$H$_7$ | S | C$_2$H$_5$ | H | S | i—C$_3$H$_7$ | 47–52°C. |
| 12 | n—C$_3$H$_7$ | S | H | i—C$_3$H$_7$ | S | n—C$_3$H$_7$ | 1.5145 |
| 13 | i—C$_3$H$_7$ | S | i—C$_3$H$_7$ | H | S | i—C$_3$H$_7$ | 65–68°C. |
| 14 | i—C$_4$H$_9$ | S | i—C$_3$H$_7$ | H | S | i—C$_4$H$_9$ | 42–46°C. |
| 15 | i—C$_4$H$_9$ | S | H | C$_2$H$_5$ | S | i—C$_4$H$_9$ | 1.5100 |
| 16 | sec—C$_4$H$_9$ | S | H | C$_2$H$_5$ | S | sec—C$_4$H$_9$ | 1.5050 |
| 17 | i—C$_4$H$_9$ | O | C$_2$H$_5$ | H | O | i—C$_4$H$_9$ | 1.4482 |
| 18 | n—C$_3$H$_7$ | S | CH$_3$ | C$_2$H$_5$ | S | n—C$_3$H$_7$ | 1.5120 |
| 19 | i—C$_3$H$_7$ | S | C$_2$H$_5$ | CH$_3$ | S | i—C$_3$H$_7$ | 1.5085 |
| 20 | i—C$_4$H$_9$ | S | CH$_3$ | C$_2$H$_5$ | S | i—C$_4$H$_9$ | 1.5065 |
| 21 | n—C$_3$H$_7$ | S | H | CH$_3$ | S | n—C$_3$H$_7$ | 1.5200 |
| 22 | i—C$_3$H$_7$ | S | CH$_3$ | H | S | i—C$_3$H$_7$ | — |
| 23 | i—C$_4$H$_9$ | S | CH$_3$ | H | S | i—C$_4$H$_9$ | 38–40°C. |
| 24 | i—C$_4$H$_9$ | S | H | H | S | i—C$_4$H$_9$ | 94–96°C. |
| 25 | 2-methylbutyl | S | H | C$_2$H$_5$ | S | 2-methylbutyl | — |

$a$=Prepared in Example I.

INSECTICIDAL EVALUATION TEST

The degree of activity of a candidate compound to hinder or impede the metamorphosis of insects is measured by treating the penultimate larval stage of a representative insect with the compound and examining it after its last molt toward the adult form for retention of immature features.

Specifically, yellow mealworm, *Tenebrio molitor*, L., larvae are maintained at 28°C. and 40 percent humidity on a diet of bran flakes. Prepupae are collected from the culture and kept in separate containers. The pupae collected once daily, are 1–25 hours old at the time of treatment. By means of a syringe, suitable amounts of candidate compounds in 0.5 or 1.0 μl of acetone are applied to the venter of *Tenebrio molitor*, L. pupae. Treated pupae are maintained at 28°C. and 40 percent humidity until the adults emerged (usually within 6–8 days). Emerged adults are graded as positive, negative, or dead. To be considered a positive response, the presence of typical pupal cuticle, urogomphi, gin trap, and abnormal wings, etc., are required. For each test, 1 group of 10 pupae was used.

The dose of a candidate compound per pupa that is needed to give a positive response in the above insecticidal evaluation test for 5 of the 10 pupae is determined. Table II shows these doses under the column ED$_{50}$, the "ED" being an abbreviation for effective dose.

TABLE II

| Compound Number | ED$_{50}$ μg/pupa |
|---|---|
| 1 | 0.8 |
| 2 | 10. |
| 3 | 0.5 |
| 4 | 0.08 |
| 5 | 0.2 |
| 6 | >10. |
| 7 | >10. |
| 8 | 0.1 |
| 9 | 0.5 |
| 10 | >10. |
| 11 | 0.1 |
| 12 | 0.5 |
| 13 | 2. |
| 14 | 3. |
| 15 | 0.003 |
| 16 | 0.02 |
| 17 | 2. |
| 18 | 10. |
| 19 | 10. |

TABLE II-continued

| Compound Number | ED$_{50}$ μg/pupa |
|---|---|
| 20 | 0.2 |
| 21 | 0.5 |
| 22 | 3.0 |
| 23 | 0.05 |
| 24 | >10. |

The compounds of this invention are generally embodied into a form suitable for convenient application. For example, the compounds can be embodied into pesticidal composition which are provided in the form of emulsions, suspensions, solutions, dusts, and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, xylene range solvents, heavy petroleum, etc.; water; emulsifying agents; surface active agents; talc; pyrophyllite; diatomite; gypsum; clays; propellants, such as dichlorodifluoromethane, etc. If desired, however, the active compounds can be applied directly to feedstuffs, seeds, etc., upon which the pests feed. When applied in such a manner, it will be advantageous to use a compound which is not volatile.

The compounds can also be combined with baits in a conventional manner.

The precise manner in which the pesticide compositions of this invention are used in any particular instance will be readily apparent to a person skilled in the art. Generally, the active pesticide compound will be embodied in the form of a liquid composition, for example, an emulsion, suspension, or aerosol spray. While the concentration of the active pesticide in the present compositions can vary within rather wide limits, ordinarily the pesticide compound will comprise not more than about 50 percent by weight of the composition. Preferably, however, the pesticide compositions of this invention will be in the form of solutions or suspensions containing about 0.1 to 1.0 percent by weight of the active pesticide compound.

What is claimed:

1. A method of impeding the metamorphasis of *Tenebrio molitor* comprising applying thereto at any stage of its development a metamorphasis inhibiting amount of a compound of the formula

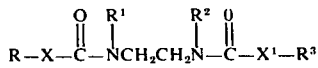

in which R is alkyl having 2 to 6 carbon atoms; $R^1$ is hydrogen or alkyl having 1 to 4 carbon atoms; $R^2$ is alkyl having 1 to 4 carbon atoms; $R^3$ is alkyl having 2 to 6 carbon atoms; X is sulfur and $X^1$ is sulfur.

2. The method of claim 1 in which R is alkyl having 2 to 6 carbon atoms, $R^1$ is hydrogen, $R^2$ is alkyl having 1 to 3 carbon atoms, $R^3$ is alkyl having 2 to 6 carbon atoms, X is sulfur and $X^1$ is sulfur.

3. The method of claim 1 in which R is alkyl having 2 to 6 carbon atoms, $R^1$ is alkyl having 1 to 3 carbon atoms, $R^2$ is alkyl having 1 to 3 carbon atoms, $R^3$ is alkyl having 2 to 6 carbon atoms, X is sulfur and $X^1$ is sulfur.

4. The method of claim 1 in which R is isobutyl, $R^1$ is hydrogen, $R^2$ is ethyl, $R^3$ is isobutyl, X is sulfur and $X^1$ is sulfur.

5. The method of claim 1 in which R is secondary butyl, $R^1$ is hydrogen, $R^2$ is ethyl, $R^3$ is secondary butyl, X is sulfur and $X^1$ is sulfur.

6. The method of claim 1 in which R is n-propyl, $R^1$ is hydrogen, $R^2$ is ethyl, $R^3$ is n-propyl, X is sulfur and $X^1$ is sulfur.

7. The method of claim 1 in which R is isobutyl, $R^1$ is ethyl, $R^2$ is ethyl, $R^3$ is isobutyl, X is sulfur and $X^1$ is sulfur.

8. The method of claim 1 in which R is isobutyl, $R^1$ is methyl, $R^2$ is ethyl, $R^3$ is isobutyl, X is sulfur and $X^1$ is sulfur.

9. The method of claim 1 in which R is 2-methylbutyl, $R^1$ is hydrogen, $R^2$ is ethyl, $R^3$ is 2-methylbutyl, X is sulfur and $X^1$ is sulfur.

* * * * *